United States Patent
Bock et al.

(10) Patent No.: US 7,041,022 B2
(45) Date of Patent: May 9, 2006

(54) ACTUATOR FOR A VEHICLE STEERING DEVICE

(75) Inventors: Michael Bock, Munich (DE); Willi Nagel, Remseck/Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/479,953

(22) PCT Filed: Jun. 11, 2002

(86) PCT No.: PCT/DE02/02079

§ 371 (c)(1),
(2), (4) Date: Dec. 8, 2003

(87) PCT Pub. No.: WO02/103221

PCT Pub. Date: Dec. 27, 2002

(65) Prior Publication Data

US 2004/0171453 A1    Sep. 2, 2004

(30) Foreign Application Priority Data

Jun. 19, 2001 (DE) ............................. 101 29 450

(51) Int. Cl.
*F16H 3/72* (2006.01)
*F16H 57/08* (2006.01)
*F16C 1/10* (2006.01)

(52) U.S. Cl. ............................ 475/7; 475/339; 74/500
(58) Field of Classification Search ................. 475/37, 475/338–9, 323, 345, 349; 74/498, 500
See application file for complete search history.

(56) References Cited

U.S. PATENT DOCUMENTS

| RE20,291 | E | * | 3/1937 | Bock | 335/305 |
| 2,345,029 | A | * | 3/1944 | Brooks | 335/305 |
| 4,616,528 | A | * | 10/1986 | Malinski et al. | 475/7 |
| 5,415,595 | A | * | 5/1995 | Nelson | 475/7 |
| 5,613,919 | A | * | 3/1997 | Nelson | 475/7 |
| 6,645,112 | B1 | * | 11/2003 | Fleytman et al. | 475/7 |
| 2001/0036880 | A1 | * | 11/2001 | Baker, Jr. | 475/339 |

FOREIGN PATENT DOCUMENTS

| DE | 1 962 923 | | 6/1971 | | |
| DE | 38 06 292 | A1 | 9/1989 | | |
| DE | 100 00 221 | A1 | 7/2001 | | |
| EP | 0 084 197 | A1 | 7/1983 | | |
| JP | 401283448 | A | * | 11/1989 | 475/7 |

\* cited by examiner

*Primary Examiner*—Roger Pang
(74) *Attorney, Agent, or Firm*—Ronald E. Greigg

(57) ABSTRACT

An actuator for superimposed steering engagement in a vehicle steering system having first and second input shafts, an output shaft coaxial with the first input shaft, and a superposition gear disposed between the shafts. The superposition gear has a two-stage, modified planetary gear that has respective sun wheels fixed on the first input shaft and the output shaft, respectively, a satellite carrier that can be driven by the second input shaft, and at least one stepped planet with two respective planet wheels that mesh with the sun wheels. The planet wheels are, spaced apart axially from one another, one on each end portion of a smaller-diameter shaft portion with which they are integral.

27 Claims, 4 Drawing Sheets

ACTUATOR FOR A VEHICLE STEERING DEVICE

CROSS-REFERENCE TO RELATED APPLICATIONS

This application is a 35 USC 371 application of PCT/DE 02/02079 filed on Jun. 11, 2002.

BACKGROUND OF THE INVENTION

1. Field of the Invention

The invention is directed to an improved actuator for superimposed steering engagement in a vehicle steering system.

2. Description of the Prior Art

With an actuator of the type with which this invention is concerned, in which the gear ratio between a change in the angle of rotation at the first input shaft and the change in the angle of rotation at the output shaft that is coaxial to the first input shaft is variable by means of an electric motor, coupled to the second input shaft, as a function of predetermined parameters, such as the rotary speed of the first input shaft, the steering angle of the vehicle wheels varies independently of the steering wheel angle, as a result of which advantages in terms of driving dynamics, safety, and riding smoothness are attained.

In a known actuator of this type, disclosed in German Patent Disclosure DE 38 30 654 A1, the superposition gear has a single-stage planetary gear with a satellite carrier, planet wheels, a sun wheel, and a ring gear; the sun wheel is connected to the first input shaft and the ring gear to the output shaft, in each case in a manner fixed against relative rotation, and the satellite carrier is connected with the second input shaft via a worm gear. The first input shaft is connected in terms of drive to the manual steering wheel, and the output shaft is connected in terms of drive to the steered vehicle wheels, and to steering gear members necessarily coupled with them. The worm gear driven by an electric motor is embodied as self-locking. Sensors are disposed on the first input shaft and on the output shaft, and their signals represent the rotary position of the shafts. The signals are delivered to a regulating device that controls the electric motor that engages the second input shaft.

SUMMARY OF THE INVENTION

The actuator of the invention has the advantage that because of the great axial spacing of the two planet wheels of a stepped planet, which is selected to be as large as structural conditions of the actuator allow, there is enough clearance for a milling cutter between the planet wheels in the region of the reduced-diameter shaft portion, and as a result the stepped planets can be manufactured in one part, and on the other hand, a large bearing base of the stepped planets is achieved, which leads to only small pivot angles of the stepped planets in the event of angular and axial offsets of the sun wheels and deviations from concentricity of the sets of teeth of the planet wheels and sun wheel. Because a stepped planet is in only one piece, the process of joining the two planet wheels is omitted, and the angular position of the sets of teeth of the two planet wheels to one another can be manufactured with precision. All the stepped planets are structurally identical; that is, the angular positions of the respective teeth of the planet wheels to one another is always the same. This increases the number of structurally identical stepped planets that can be mass produced and simplifies assembly and logistics. Because of the resultant only small pivot angle of the stepped planets for compensation of the offsets of the sun wheels, which angle is established because of the large bearing base, tooth engagement is unimpeded by the slight tilting of the stepped planets, so that unlike the situation with large pivot angles of the stepped planets, neither high wear, nor great friction, nor additional noise production occur. Upon stress on the planetary gear from misuse, the shaft portion of the stepped planet between the two planet wheels is severely stressed torsionally. If the stepped planets do not all bear loads equally, a plastic torsional deformation of one or more stepped planets will occur. After a slight plastic deformation, all the stepped planets again bear loads equally, so that an overload on a single stepped planet is precluded.

Advantageous refinements of and improvements to the actuator are disclosed.

In an advantageous version of the invention, the shaft portion between the two planet wheels of a stepped planet has such a great axial length that in the case of a drive coupling, embodied as a worm gear, of the second input shaft and the satellite carrier, a worm wheel of the worm gear, which wheel is embodied as a satellite carrier, can be placed in the region of the shaft portion; that is, the planet wheels are located outside the region of the satellite carrier that receives the worm wheel, with a preferably symmetrical axial spacing from a plane that passes through the second input shaft. This has the advantage that while simultaneously a large bearing base of the stepped planet is assured, the worm gear can be accommodated in the actuator in a way that is neutral in terms of structural length.

In a preferred version of the invention, the satellite carrier is embodied hollow-cylindrically and is closed on each face end with a respective plate. The rotary bearing of the stepped planets is accomplished in the interior of the satellite carrier by means of roller bearings. The satellite carrier, with the preferably integrally attached toothing, or set of teeth, of the worm wheel of the claimed worm wheel gear, along with the stepped planets and the satellite carrier plates secured to the satellite carrier, thus form a unit that can be preassembled, into which the sun wheels connected to the first input shaft and to the output shaft in a manner fixed against relative rotation can later be installed through a central bore in the satellite carrier plates.

In an advantageous version of the invention, each stepped planet has bearing journals on its ends that are coaxial with the axis of the stepped planet and are each braced via a respective roller bearing in a bearing bore made in each satellite carrier plate. Because the roller bearings are disposed in the satellite carrier plates, further widening of the bearing base of the stepped planet is made possible and makes the requisite installation space for a roller bearing available. The roller bearings reduce the friction of the planetary gear.

If a plurality of structurally identical stepped planets, for instance three of them, are present in the satellite carrier, then the bearing bores, provided in each satellite carrier plate, for receiving the bearing journals of the stepped planets are offset from one another by a defined circumferential angle, which differs slightly from a uniform angular pitch, which for three stepped planets would be 120°. This assures that with stepped planets embodied structurally identically, the planetary gear can be adapted upon assembly, and the sun wheels can be inserted into the planetary gear.

To avoid tooth play in the planetary gear, in an advantageous version of the invention, the bearing bore, where there is only one stepped planet in the planetary gear, in each satellite carrier plate is embodied resiliently in the radial direction, while with a plurality of stepped planets, only one of the bearing bores required in each satellite carrier plate is so embodied.

In an alternative version of the invention, each stepped planet is embodied as hollow and is braced on an insertion shaft, retained in receiving bores in the satellite carrier plates, via two roller bearings spaced maximally apart from one another. The roller bearings are disposed in the region of the planet wheels. This structural design has the advantage that on the one hand the satellite carrier plates can be made quite thin, preferably thinner than 3 mm, and can therefore be produced with simple, cost-saving production methods, and on the other, the stepped planets can be built into the preassembled structural unit comprising the satellite carrier, worm wheel and satellite carrier plates, later. Since the roller bearings require no additional installation space, the axial length of the actuator can be shortened.

When there are at least three stepped planets in the satellite carrier plate, the receiving bores for the insertion shafts of the stepped planets in the satellite carrier plates are each offset from one another by defined circumferential angles that differ from equal angular pitch, and the satellite carrier is rotatably supported on both sun wheels via the planet wheels of the stepped planets; the first input shaft that carries one sun wheel and the output shaft that carries the second sun wheel are rotatably supported in the actuator housing via roller bearings. In this case as well, one of the receiving bores for the insertion shafts in each satellite carrier plate is embodied as resilient in the radial direction, and the resilient receiving bore in each satellite carrier plate has a radial spacing from the axis of the satellite carrier plate that differs from the equal radial spacings of the other receiving bores and that is less in the installed state of the planetary gear. This structural design has the advantage that roller bearings for bracing the satellite carrier on the first input shaft and the output shaft can be omitted, making cost savings possible. Since all the stepped planets are pressed into the sets of sun wheel teeth, they all bear loads; that is, there is a power distribution over all the stepped planets. In comparison with the structural version referred to earlier above, in which the stepped planets in the satellite carrier plates and the satellite carrier plates are each braced on the input shafts and output shafts via roller bearings, the cushioned stepped planet is exposed to a lesser mechanical load, so that the spring force required for cushioning the stepped planet can be made smaller.

In an advantageous version of the invention, the teeth of the sun wheels are embodied as slightly crowned. This has the advantage that even the slight pivot angle of the stepped planet that is established in the event of offsets of the sun wheels will not lead to edge bearers, so that any wear that still occurs, and residual friction and noise production, are also diminished further.

In an advantageous version of the invention, the radially resilient embodiment of the receiving bores for the insertion shaft of a stepped planet is realized in both satellite carrier plates by a respective spring arm having the receiving bore; this arm is cut out of the satellite carrier plate in such a way that its arm cross section increases, from the free end that has the receiving bore to an arm root joined to the satellite carrier plate. As a result, the spring arm is designed on the principle of equal bending stress.

If equal spring characteristic for generating the cushioning force is to be achieved, the reduced thickness of the satellite carrier plates means a greater bending length is needed, which in an advantageous version of the invention is attained by providing that each of the satellite carrier plates has a protrusion that extends over a small circumferential angle and reaches as far as the outer contour of the satellite carrier, and that the root of the spring arm is disposed in this protrusion. The protrusion and the recess simultaneously serve to align the satellite carrier plates with one another.

In an advantageous version of the invention, the actuator housing is closed off in fluid-tight fashion by means of a housing cap, and a bore discharging in the interior of the actuator housing is made in the actuator housing and is closed with a stopper. This stopper has several functions. First, it assures precise positioning between the worm wheel and the worm of the worm gear, regardless of the individual tolerances of the worm gear. Second, it closes the oil-filled actuator housing in fluid-tight fashion; and finally, by means of a permanent magnet disposed on its inside, it assures that steel abrasion will be bound to the planetary gear, so that planetary gear wear is reduced and the service life is lengthened. Making the bore parallel to the second input shaft has advantages in terms of production technology and low tolerances.

BRIEF DESCRIPTION OF THE DRAWINGS

The invention is explained in further detail herein below, with reference to the drawings, in which.

DESCRIPTION OF THE PREFERRED EMBODIMENTS

Figure 1:
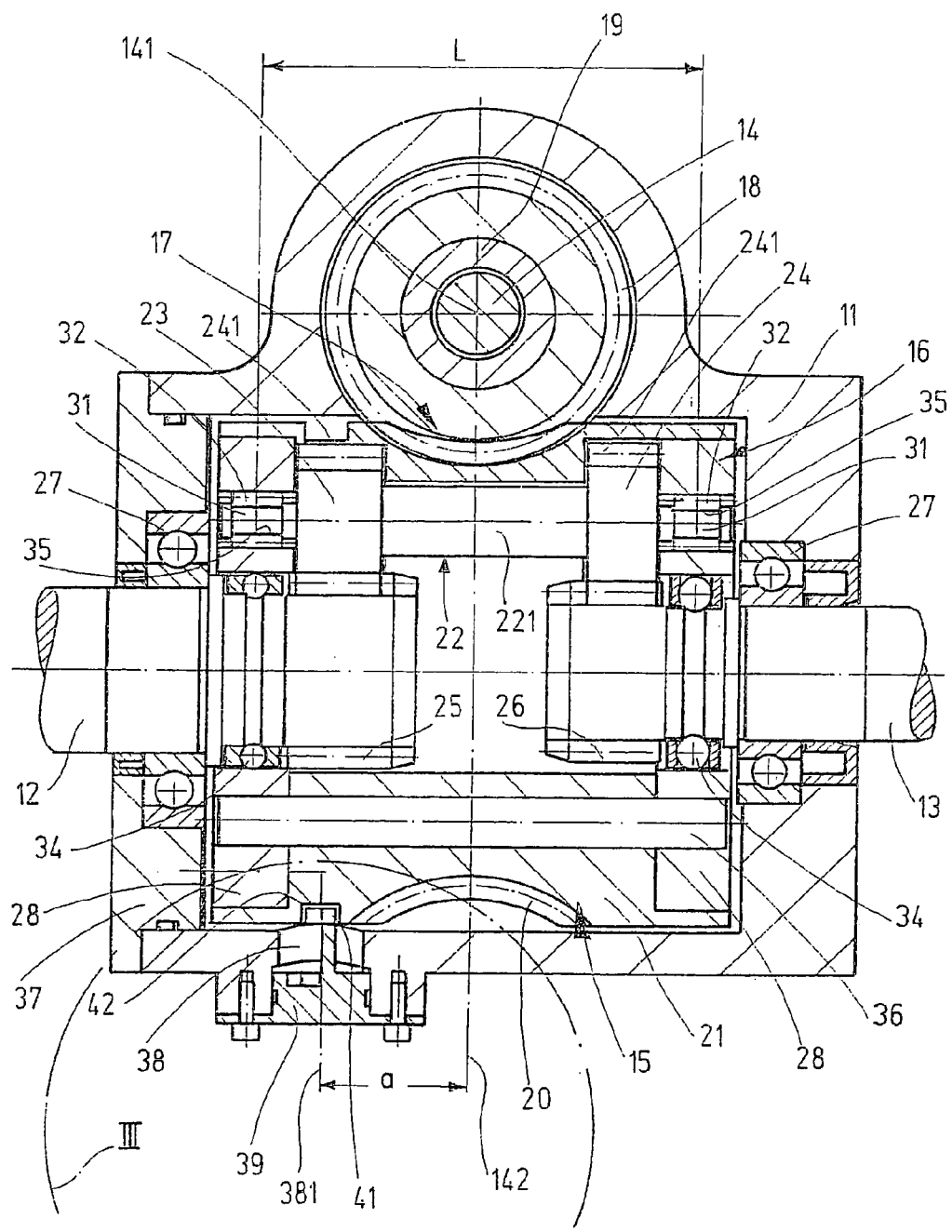
FIG. 1 is a longitudinal section through an actuator for superimposed steering engagement in a vehicle steering system.

The actuator shown in longitudinal section in FIG. 1 for superimposed steering engagement in a vehicle steering system is preferably integrated with the steering gear that can also be built into the steering column of the vehicle, and with an actuator housing 11, it is solidly connected to the chassis or the vehicle body via a steering gear or steering column carrier, not shown in FIG. 1. The actuator has a first input shaft 12, which is coupled with a manual steering wheel; an output shaft 13 coaxial with the first input shaft and connected in terms of drive to the steered vehicle wheels, or steering gear members necessarily coupled with the steered wheels; and a second input shaft 14, which is drivable via an electric motor, not shown here. A superposition gear 15 received in the actuator housing 11 is disposed between the aforementioned shafts 12–14, and with this gear, the gear ratio between a change in the angle of rotation of the first input shaft 12 and the change in the angle of rotation of the output shaft 13 is variable via the second input shaft 14 as a function of predetermined parameters, such as the rotary speed of the first input shaft 12. Each input shaft 12 and 14 and the output shaft 13 is assigned a sensor, not shown in FIG. 1, that detects the angle of rotation and/or the rotary speed of the respective shaft. The measurement signals of the sensors are carried to a regulating device that controls the electric motor.

The superposition gear 15 has a two-stage, modified planetary gear 16 as well as a self-locking worm gear 17, by way of which worm gear the planetary gear 16 is driven by the electric motor. Self-locking means that only the electric motor can drive the planetary gear, but not vice versa. The worm gear 17 includes a plastic worm 18 which is extruded either directly onto the second input shaft 14 driven by the electric motor or onto a metal sheath 19, which in turn is pressed onto the second input shaft 14, and also includes a worm wheel 20, which is seated on a satellite carrier 21 of the planetary gear 16 to be described below and forms a structural unit with the planetary gear.

The two-stage planetary gear 16 has, besides the satellite carrier 21, at least one stepped planet 22 supported rotatably on the satellite carrier 21. Preferably, there are three stepped planets 22, but to reduce the torque to be transmitted from each stepped planet 22, more than three stepped planets 22 may also be provided. Each stepped planet 22 is embodied in one piece and has two planet wheels 23, 24, spaced apart axially from one another, with respective sets of teeth 231 and 241; the axial spacing of the two planet wheels 23, 24 is selected to be as great as possible, with given structural conditions setting the limit on the spacing. The two planet wheels 23, 24 are disposed one on each end portion of an elongated shaft portion 221 of the stepped planet 22; this shaft portion has an outside diameter that is smaller than the diameter of the tooth base of the sets of teeth 231, 241. By means of the spacing arrangements of the two planet wheels 23, 24 with the smaller-diameter shaft portion 221, located between them, for each stepped planet 22, a sufficient milling cutter clearance is achieved between the planet wheels 23, 24 for making the stepped planet 22 in one piece and establishing the angular position of the sets of teeth 231, 241 of the planet wheels precisely relative to one another. Meshing with the stepped planet 22 are two sun wheels 25, 26, of which the sun wheel 25 is connected to the first input shaft 12 and the sun wheel 26 is connected to the output shaft 13, in both cases in a manner fixed against relative rotation. The first input shaft 12 and the output shaft 13 are rotatably supported in the actuator housing 11 via roller bearings 27, embodied here as ball bearings.

Figure 2:
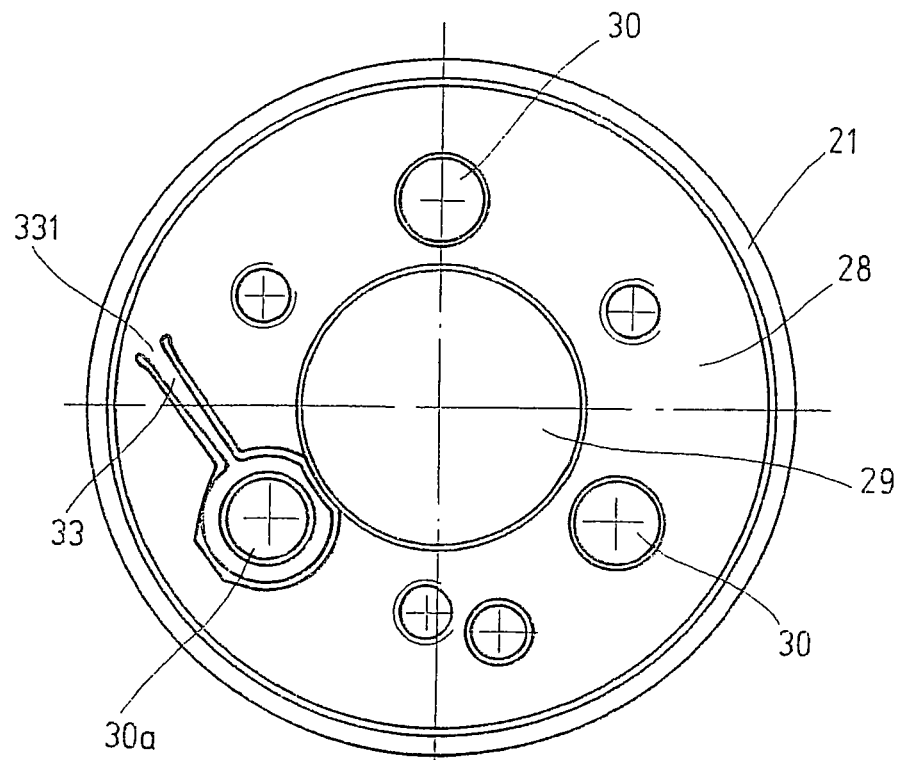
FIG. 2, an end view of a satellite carrier in the actuator of FIG. 1.

The satellite carrier 21 is embodied hollow-cylindrically and is covered on each face end with a respective satellite carrier plate 28 of hardened spring steel. Each satellite carrier plate 28 has a central bore 29 (FIG. 2) as well as bearing bores 30, disposed on a pitch circle; the number of bores corresponds to the number of stepped planets 22. The diameter of the central bore 29 is precisely large enough that the two sun wheels 25, 26 can be press-fitted afterward upon assembly into the preassembled planetary gear 16. As can be seen in FIG. 1, each stepped planet 22 has two bearing journals 31 on its ends, and the bearing journals each protrude into one of the bearing bores 30 in the two satellite carrier plates 28 and are braced in the bearing bore 30 via a roller bearing 32. In the exemplary embodiment of FIGS. 1 and 2, corresponding to the three stepped planets present in the interior of the satellite carrier 21, there are three bearing bores 30 in each satellite carrier plate 28, offset from one another by a defined circumferential angle. The three spacing angles between the bearing bores 30 are slightly unequal to 120°, which is the prerequisite for allowing the structurally identical stepped planets 22, with the same angular position of the various teeth of the planet wheels 23, 24, to fit together with the sun wheels 25, 26 and to allow the sun wheels 25, 26 to be inserted into the preassembled structural unit of the satellite carrier 21. One of the bearing bores 30, marked 30a in FIG. 2, is embodied resiliently in the radial direction. This is accomplished by placing the bearing bore 30a in a spring arm 33, which is cut out from the satellite carrier plate 28 and is joined to the satellite carrier plate 28 only by a root 331 of the arm. The cross section of the spring arm 33 increases from the end that has the bearing bore 30a to the root 331, thus lending the spring arm 33 an optimized shape in terms of bending stress. The resilient bearing bore 30a has a radial spacing from the axis of the satellite carrier plate 28 that differs from the constant radial spacing of the two bearing bores 30 that are not resilient and is less than that spacing in the relieved state. In the assembled state of the satellite carrier 22, the spring arm 33 is deflected outward and exerts a radial spring tension, oriented toward the axis of the satellite carrier 21, which assures freedom of play of the planetary gear 16. Spring steel as a material for the satellite carrier plate 28 is an ideal heavy-duty material for the spring arm 33. A roller bearing 34 is also disposed in each satellite carrier plate 28. Via these two roller bearings 34, the satellite carrier 21 is braced on the one hand on the first input shaft 12 and on the other on the output shaft 13 coaxial with it.

As already noted, the bearing journals 31 of the stepped planets 22 are rotatably supported in the bearing bores 30 (FIG. 2) of the satellite carrier plates 28 by means of roller bearings 32. To that end, annular bearing grooves 35 are punched onto the bearing journals 31, and the roller bearings 32 in the form of needle rings are clipped into these grooves. Spring steel as a material for satellite carrier plates 28 is hard enough to form the running faces for the roller bodies in the form of needles. Upon assembly of the satellite carrier 21, the needle rings are first clipped into the bearing grooves 35, so they can no longer fall away during assembly. The stepped planets 22 are installed in the satellite carrier 21, with the satellite carrier plates 28 being aligned with one another in the direction of rotation via a centering pin 36 (FIG. 1). By means of axially screwed-in screws 45, shown only in FIG. 3, the satellite carrier plates 28 are retained on the satellite carrier 21. Now the sun wheels 25, 26 are passed through the central bores 29 in the satellite carrier plates 28; the sets of teeth of the sun wheels 25, 26 are chamfered on the free end outside the engagement region of the planet wheels 23, 24, SO that the sets of teeth of the sun wheels 25,26 can easily be introduced into the sets of teeth 231, 241 of the planet wheels 23, 24.

For the function of the planetary gear 16, a single stepped planet 22 suffices, specifically the stepped planet that is received in the resilient bearing bore 30a in the two satellite carrier plates 28. When the load is slight, the other two stepped planets 22 run with flank play in the toothing and bear no load, but at higher loads they too are load-bearing.

As a result of the described spacing arrangement of the planet wheels 23, 24, with the smaller-diameter shaft portion 221 of the stepped planets 22 between them and with the integration of the roller bearings 32 into the satellite carrier plates 28, a large bearing base L of the stepped planets 22 is advantageously achieved, as shown in FIG. 1. In the event of angular and axial offsets of the sun wheels 25, 26 and deviations from concentricity of the sets of teeth for the planet wheels and sun wheels, deviations that are compensated for by the stepped planets 22 in the form of tilting, this large bearing base means that pivot angles of the stepped planets 22 are only slight, so that edge bearers, with the consequence of high wear, major friction, and additional noise production, are greatly diminished. In addition, the teeth of the sun wheels 25, 26 are embodied as slightly crowned; that is, the tooth flanks drop away in a curve in the axial direction from the middle of the toothing portion to the two ends of the toothing portion. Because of this crowning, in no case does even the remaining slight tilt angle of the stepped planets 22 lead to an edge bearer and its consequences as described.

Still another advantage is attained as a result of the spacing arrangement of the planet wheels 23, 24 of the stepped planets 22. Typically, not all the stepped planets 22 bear loads equally; that is, tolerances cause some stepped planets 22 to transmit less torque than the others. In the event of an overload in the steering that occurs while the vehicle is in motion, the relatively long shaft portion 221 between the two planet wheels 23, 24 undergoes severe torsional stress. If not all the stepped planets 22 are bearing loads equally, plastic torsional deformation of the shaft portion 221 occurs in one or more of the stepped planets 22. After this permanent deformation, all the stepped planets 22 then bear loads equally and transmit the same torque. The disposition of the roller bearings 32 in the satellite carrier plates 28 furthermore makes it possible to widen the bearing base L of the stepped planets 22; the relatively thick satellite carrier plates 28 make sufficient installation space available for the roller bearings 32. Because the stepped planets 22 are supported by roller bearings, the friction in the planetary gear 16 is reduced. Because of the large bearing base L, combined with the low-play roller bearing support, tangential forces engaging the planet wheels 23, 24 cannot cause the stepped planets 22 to tilt, and thus a rigid planetary gear 16 is achieved.

Figure 3:
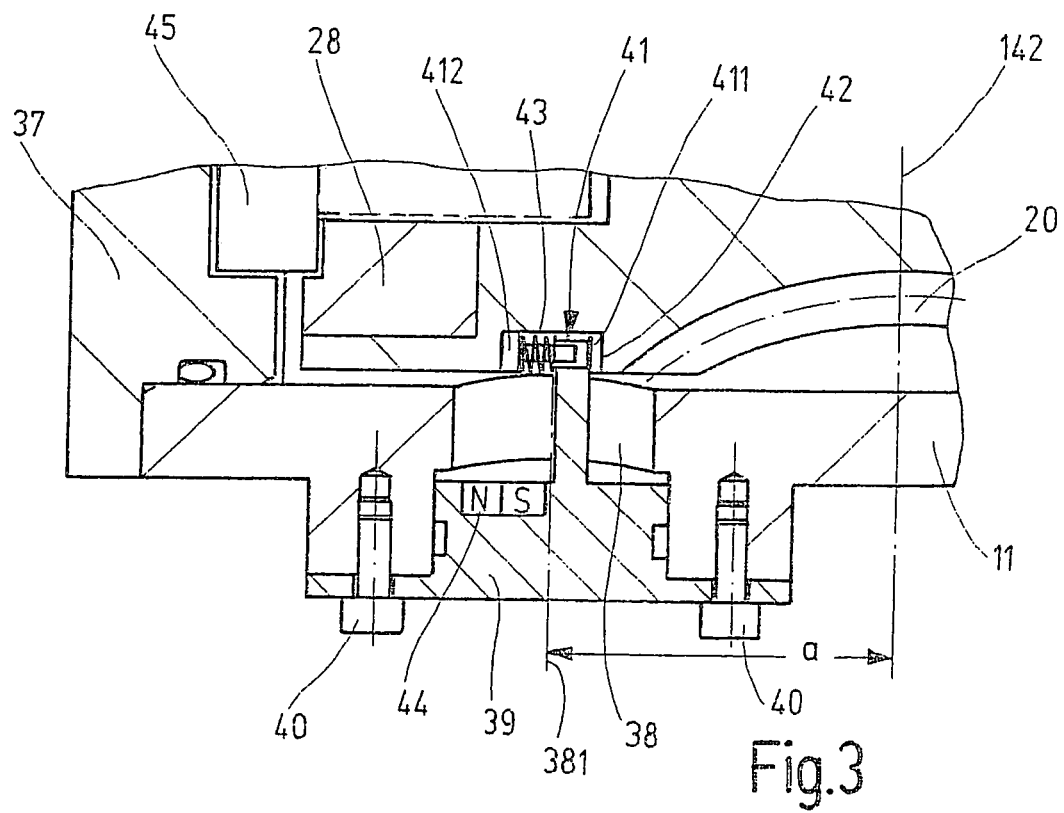
FIG. 3, an enlarged view of the detail marked III in FIG. 1.

The actuator housing 11, embodied in cup-shaped form, is closed in fluid-tight fashion by means of a housing cap 37; the roller bearing 27 that receives the first input shaft 12 is integrated with the housing cap 37. The actuator housing 11 has a bore 38. The bore 38 is preferably made into the actuator housing 11 parallel to the second input shaft 14, and its bore axis 381 (FIGS. 1 and 3) has a close-tolerance spacing a from a plane 142 that extends through the axis 141 of the second input shaft 14. The bore 38 opening into the interior of the actuator housing 11 is closable in fluid-tight fashion by means of a stopper 39, and the stopper 39 is secured, after being inserted into the bore 38, to the actuator housing 11 by means of screws 40. In FIG. 1, the bore 38 and the stopper 39 are shown rotated 90° into the plane of the drawing. FIG. 3 shows the same view, enlarged. The stopper 39 combines several functions in itself. One of these functions is the axial guidance of the satellite carrier 21 with the worm wheel 20 embodied on it. To that end, a sliding block 41 is disposed on the stopper 39 and protrudes into an annular groove 42 punched into the satellite carrier 21. The sliding block 41 comprises two sliding block parts 411, 412, which are spread apart from one another by a compression spring 43 between them, so that each sliding block part 411, 412 is pressed against one flank of the annular groove 42. Because of this pressing of the sliding block parts 411, 412 against the groove flanks, the axial position of the worm wheel 20 is defined, and it is assured that the worm wheel 20 is always guided axially without play. This cushioning also compensates for component tolerances of the sliding block 41 and annular groove 42 and minimizes any wear that occurs. This structural embodiment of the axial guidance of the worm wheel 20 is simple, economical, and easy to assemble. The frictional moment generated in the axial guidance is braced directly on the actuator housing 11. The frictional moment must be brought to bear by the electric motor, while the normal drive through from the first input shaft 12 to the output shaft 13 is not subjected to the frictional moment, so that the friction in the steering train is not increased. Moreover, the chain of tolerances between the worm 18 and the worm wheel 20 becomes less; that is, the worm 18 and worm wheel 20 can be positioned more precisely relative to one another. In the assembly of the actuator, the stopper 39 is installed as the final component. As a result, in the assembly of the housing cap 37 and of the electric motor, air positively displaced out of the actuator housing 11 can escape via the bore 38, and thus no overpressure can build up in the actuator housing 11. After this assembly operation, the actuator housing 11 is filled with oil through the bore 38, and the stopper 39 is inserted, which thus as a further function has the task of sealing off the actuator housing 11.

A permanent magnet 44 is mounted on the inside of the stopper 39 and binds steel that has abraded from the planetary gear 16, so that there is less gear wear and the service life of the actuator is longer.

Figure 4:
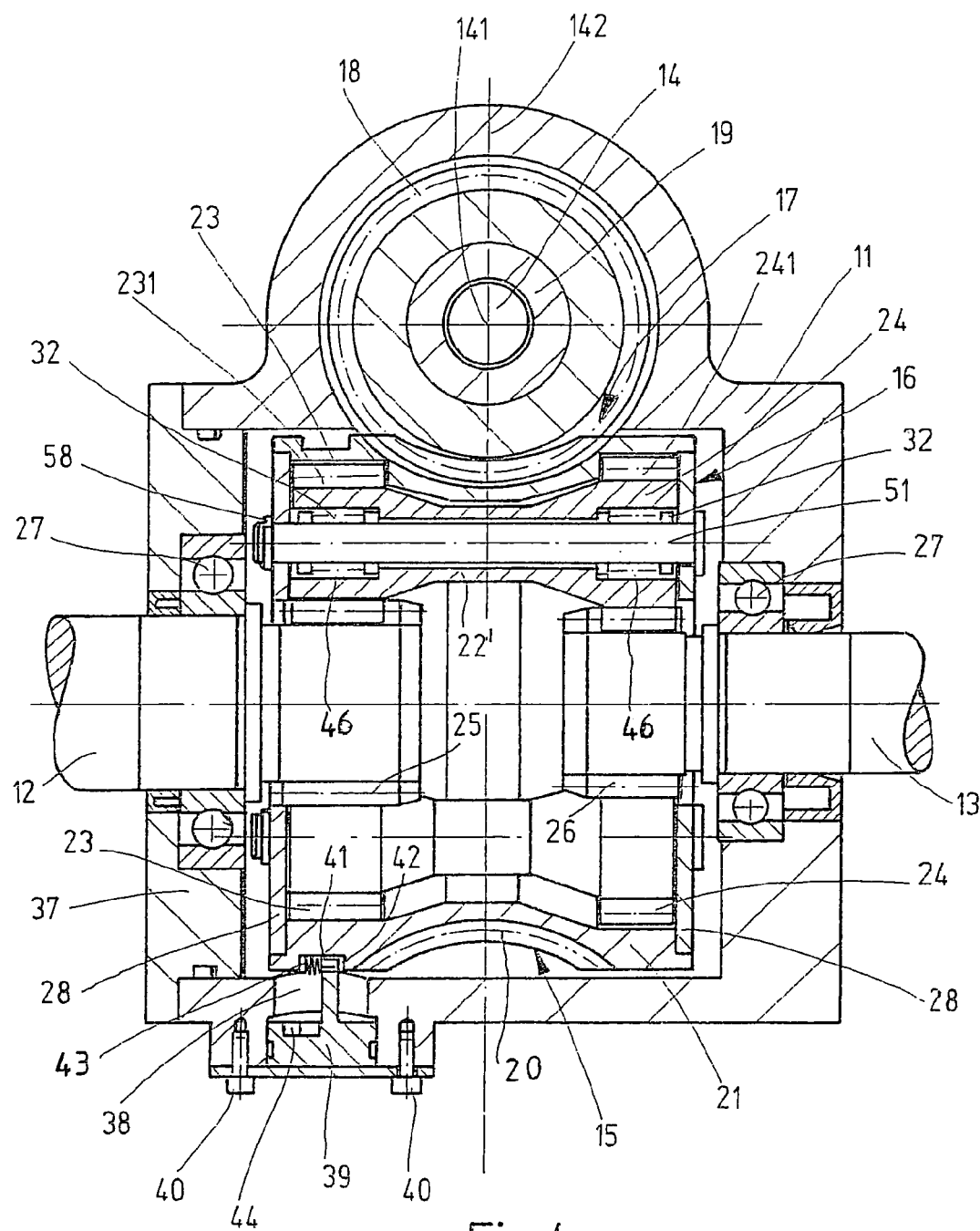
FIG. 4, a longitudinal section through a modified exemplary embodiment of an actuator for superimposed steering engagement in a vehicle steering system.

The actuator for superimposed steering engagement in a vehicle steering system, shown in longitudinal section in FIG. 4, is modified in various ways compared to the actuator described above. Components of this actuator that match components of the actuator described in conjunction with FIG. 1 are identified by the same reference numerals.

Figure 5:
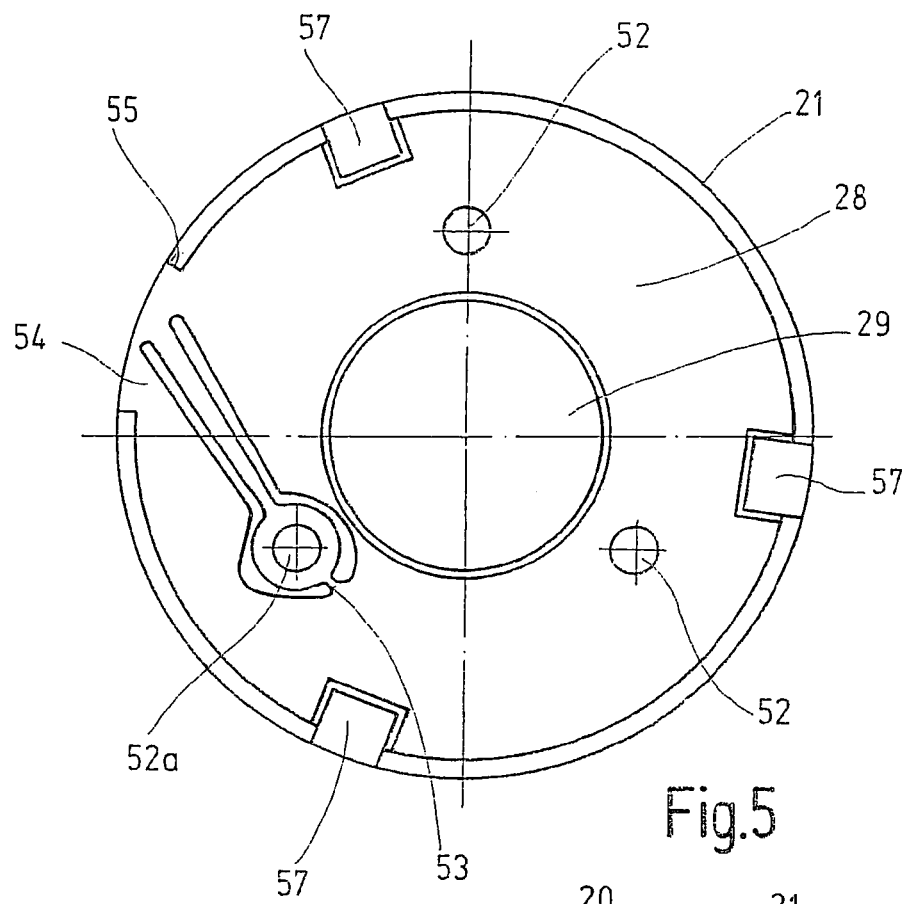
FIG. 5, an end view of a satellite carrier in the actuator of FIG. 4.

The stepped planets 22', of which three are provided in the planetary gear 16, are embodied hollow-cylindrically and are rotatably supported on an insertion shaft 51 by means of the roller bearings 32. The roller bearings 32 are embodied as needle rings, which in the assembled state are enclosed in bearing bores 46 of the stepped planets 22' and as a result cannot migrate out of them. The bearing bores 46 are drilled into the inner wall of the stepped planet 22' in the region of the planet wheels 23, 24, so that the roller bearings 32 directly absorb the radial forces that engage the planet wheels 23, 24. As FIG. 5 shows, in each satellite carrier plate 28 there are three receiving bores 52, offset from one another by defined circumferential angles that differ slightly from 120°; these bores serve to receive the insertion shafts 51. One of the receiving bores 52a is disposed radially resiliently in the same way and to that end is disposed on the spring arm 33 that is cut out from the satellite carrier plate 28. The two nonresilient receiving bores 52 have an equal radial spacing from the axis of the satellite carrier plate 28, while the resilient receiving bore 52a has a spacing differing from that, which is less in the relieved state of the spring arm 33. The satellite carrier 21 with the worm wheel 20, embodied integrally with it, of the worm gear 17 is supported directly on the sun wheels 25, 26 via the sets of teeth 231, 241 of the planet wheels 23, 24. As a result, the roller bearings 34 present in the actuator of FIG. 1 can be omitted, which has a cost advantage. This bearing principle requires the presence of all three stepped planets 22'. Since all three stepped planets 22' are pressed into the sets of teeth of the sun wheels 25, 26, all three stepped planets 22' in the resilient state have the same axial spacing from the sun wheels 25, 26, so that there is a power allocation among all three stepped planets 22', and all three stepped planets 22' each carry one-third of the total load. Thus compared to the version of FIG. 1, the resilient stepped planet 22' is exposed to a lesser mechanical load, and so the requisite spring force of the spring arm 33 can be made less.

Figure 6:
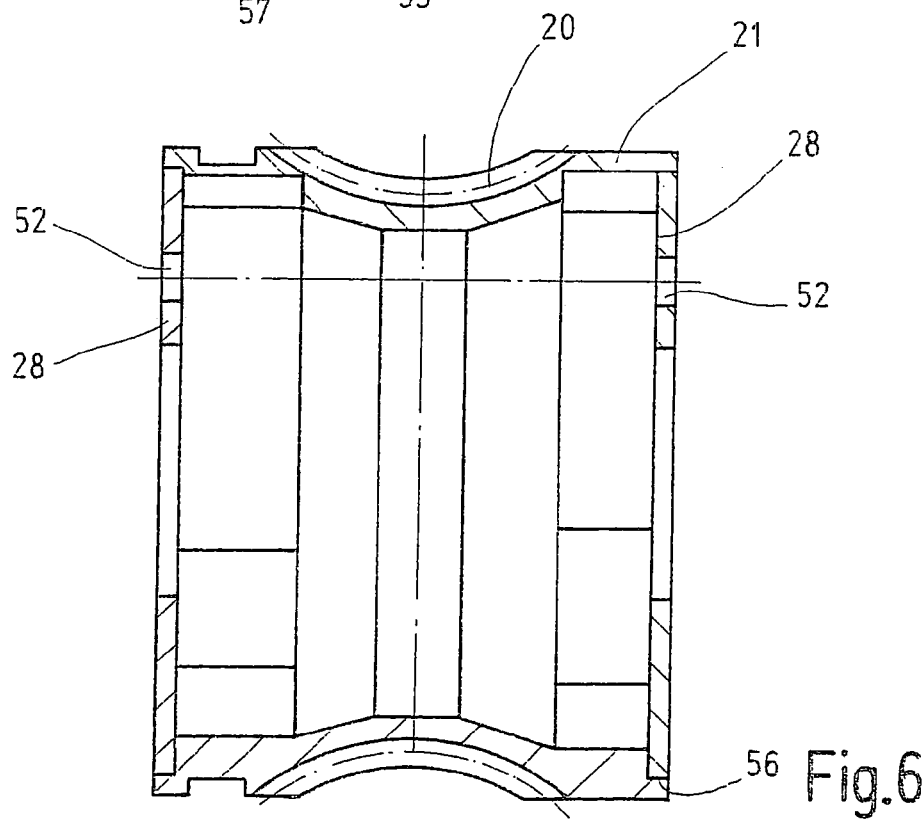
FIG. 6, a longitudinal section through the satellite carrier of FIG. 5 in the pre-assembly state.

As a further modification, the satellite carrier plates 28, also made from spring steel, which unlike those in the actuator of FIG. 1 no longer receive the roller bearings 32 of the stepped planets 22, are embodied as quite thin; the plate thickness is selected to be less than 3 mm. As a result, the satellite carrier plates 28 can be produced economically in a stamping process or a laser cutting process. The receiving bores 52 are then initially provided with an adequate machining margin, and the spring arm 33 that carries one receiving bore 52 is then still fixed by means of a web 53. The satellite carrier plates 28 are also given a protrusion 54, which extends over a small circumferential angle and can be placed in a recess 55 on the face end of the satellite carrier 21. Each satellite carrier plate 28 is placed in a coaxial recess 56 (FIG. 6) that is machined into the face end of the satellite carrier 21. The spring arm 33 is lengthened to extend into the protrusion 54, so that the root 331 of this arm is located in the protrusion 54. This greater bending length of the spring arm 33 compensates for the bending stress that increases because of the slight thickness of the satellite carrier plate 28, so that with the lengthened spring arm 33, an equal radial spring force, as in the actuator in FIG. 1, can be brought to bear on the resilient stepped planet 22. Because of the positive engagement between the recess 55 and the protrusion 54, the two satellite carrier plates 28 are aligned positionally correctly to one another in the joining process. After the joining process, the satellite carrier plates 28 in the hollow-cylindrical satellite carrier 21 are joined to the satellite carrier 21 in a manner fixed against relative rotation, specifically by calking or welding in various positions. In FIG. 5, three positions are provided, indicated by reference numeral 57.

The thus preassembled structural unit comprising the satellite carrier 21 and satellite carrier plates 28 is now machined in final form in a chuck; the receiving bores 52 in the two satellite carrier plates 28 are finish-machined there to the final size. It is thus assured that the receiving bores 52 are exactly aligned with one another and have an exactly defined position. After the finish-machining of the receiving bores 52, the web 53 between the spring arm 33 and the satellite carrier plate 28 is severed, so that the spring arms 33 in both satellite carrier plates 28 can now yield. As the final machining operation, the worm wheel 20 in the satellite carrier 21 is milled.

Into this completely finished structural unit, the above-described hollow stepped planets 22 are now built in. They are introduced into the satellite carrier plates 28 through the central bores 29 and are fixed or rotatably supported by means of the insertion shafts 51. An axial securing means 58 at the insertion shafts 51 assures that the insertion shafts 51 cannot be displaced axially.

The actuator shown in FIG. 4 has the advantage over the actuator shown in FIG. 1 of a reduced gear mass and a shorter axial structural length.

The foregoing relates to preferred exemplary embodiments of the invention, it being understood that other variants and embodiments thereof are possible within the spirit and scope of the invention, the latter being defined by the appended claims.

The invention claimed is:

1. An actuator device for superimposed steering engagement in a vehicle steering system, including first and second input shafts (12, 14), an output shaft (13) coaxial with the first input shaft (12), and a superposition gear (15) disposed between the first and second input shafts (12, 14) and received in an actuator housing (11), the superposition gear (15) comprising a two-stage, modified planetary gear (16), which has a first sun wheel (25), connected in a manner fixed against relative rotation to the first input shaft (12), a second sun wheel (26) connected in a manner fixed against relative rotation to the output shaft (13), a satellite carrier (21) that is drivable by the second input shaft (14), and at least one one-piece stepped planet (22; 22') retained rotatably on the satellite carrier (21), with two planet wheels (23, 24) spaced apart axially from one another and disposed one at each end portion of a smaller-diameter shaft portion (221), with one planet wheel meshing with the first and the other planet wheel meshing with the second sun wheel (25, 26), and a self-locking worm gear (17) disposed between the second input shaft (14) and the satellite carrier (21), the worm gear having a worm (18) connected to the second input shaft (14) in a manner fixed against relative rotation, and a worm wheel (20) connected to the satellite carrier (21) in a manner fixed against relative rotation, the worm wheel (20) being placed on the satellite carrier (21) being the region of the shaft portion (221) of the stepped planets (22; 22'), and the satellite carrier (21) being embodied hollow-cylindrically.

2. The actuator device of claim 1, further comprising roller bearing means (32) rotatably supporting a rotary bearing of the at least one stepped planet (22; 22') in the interior of the satellite carrier (21).

3. The actuator device of claim 2, wherein the at least one stepped planet (22) comprises bearing journals (31) on its ends, which bearing journals are each braced via a respective roller bearing (32) in a bearing bore (30*a*) in the satellite carrier plates (28); and wherein preferably the roller bearings (32) are embodied as slotted needle rings each clipped into a bearing groove (35) made in each bearing journal (31).

4. The actuator device of claim 3, wherein the bearing bore (30*a*) is embodied resiliently in the radial direction.

5. The actuator device of claim 4, wherein a plurality of structurally identical stepped planets (22) are present in the satellite carrier (21) and are received with their bearing journals (31) in bearing bores (30) offset from one another in each satellite carrier plate (28) by a defined circumferential angle that differs slightly from a uniform angular pitch, and wherein in each satellite carrier plate (28), one of the bearing bores (30*a*) is embodied resiliently in the radial direction, and its radial spacing from the axis of the satellite carrier plate (28) differs from the radial spacings of the other two bearing bores (30) from the axis of the satellite carrier plate (28), which latter spacings are in turn of equal size.

6. The actuator device of claim 1, wherein the sun wheels (25, 26) comprise sets of teeth whose teeth are embodied in crowned form.

7. The actuator device of claim 5, wherein the radially resilient embodiment of the bearing bore (30*a*) and the receiving bores (52*a*) for the bearing journals (31) and the insertion shafts (51), respectively, of a stepped planet (22') comprises a respective spring arm (33) that has the bearing bore and receiving bore (30*a*; 52*a*), respectively, and wherein this arm is cut out of the satellite carrier plate (28) in such a way that, from a free end that supports the respective bearing bore and receiving bore (30*a*; 52*a*) to an arm root (331) joined to the satellite carrier plate (28), its arm cross section increases.

8. The actuator device of claim 7, wherein each satellite carrier plate (28) is inserted into a recess (56) made in the face ends of the satellite carriers (21), and each satellite carrier plate (28) has a protrusion extending over a small circumferential angle, which positively engages a recess (55) in the satellite carrier (21); and wherein the arm root (331) is located in the protrusion (54).

9. The actuator device of claim 1, further comprising a housing cap (37) closing off the actuator housing (11) in fluid-tight fashion; a bore (38) made into the actuator housing (11), parallel to the second input shaft (14); and a stopper (39) closing the bore (38).

10. The actuator device of claim 9, wherein the axis (341) of the bore (38) has a close-tolerance axial spacing from a plane (142) that passes through the axis (141) of the second input shaft (14).

11. The actuator device of claim 9, further comprising a sliding block (41) embodied on the stopper (39) and engaging an annular groove (42) extending all the way around the outside in the satellite carrier (21) and braced resiliently on both flanks of the annular groove (42).

12. The actuator device of claim 11, wherein the sliding block (41) has two sliding block parts (411, 412), which are spread apart in the axial direction by a compression spring (43) disposed between them.

13. The actuator device of claim 9, further comprising a permanent magnet (44) disposed on the inside of the stopper (39).

14. An actuator device for superimposed steering engagement in a vehicle steering system, including first and second input shafts (12, 14), an output shaft (13) coaxial with the first input shaft (12), and a superposition near (15) disposed between the first and second input shafts (12, 14) and received in an actuator housing (11),
the superposition gear (15) comprising a two-stage, modified planetary gear (16), which has a first sun wheel (25), connected in a manner fixed against relative rotation to the first input shaft (12), a second sun wheel (26) connected in a manner fixed against relative rotation to the output shaft (13), a satellite carrier (21) that is drivable by the second input shaft (14), and at least one one-piece stepped planet (22; 22') retained rotatably on the satellite carrier (21), with two planet wheels (23, 24) spaced apart axially from one another and disposed one at each end portion of a smaller-diameter shaft portion (221), with one planet wheel meshing with the first and the other planet wheel meshing with the second sun wheel (25, 26), and a self-locking worm gear (17) disposed between the second input shaft (14) and the satellite carrier (21), the worm gear having a worm (18) connected to the second input shaft (14) in a manner fixed against relative rotation, and a worm wheel (20) connected to the satellite carrier (21) in a manner fixed against relative rotation, the worm wheel (20) being placed on the satellite carrier (21) being the region of the shaft portion (221) of the stepped planets (22; 22'), and the satellite carrier (21) being embodied hollow-cylindrically, wherein the satellite carrier (21) is covered on each face end by a respective satellite carrier plate (28) and in its interior has the at least one stepped planet (22; 22') and both sun wheels (25, 26).

15. The actuator device of claim 14, further comprising a centering pin (36) extending parallel to the axis of the actuator housing (11), the centering pin (36) aligning the two satellite carrier plates (28) with one another in the circumferential direction.

16. The actuator device of claim 14, further comprising roller bearings (27), preferably ball bearings rotatably supporting the first input shaft (12) and the output shaft (13) in the actuator housing (11), and roller bearings (34), preferably ball bearings, bracing the satellite carrier (21) on the first input shaft (12) and on the output shaft (13), respectively, disposed in the satellite carrier plates (28).

17. The actuator device of claim 14, wherein the satellite carrier plates (28) are made from hardened spring steel.

18. The actuator device of claim 14, wherein each satellite carrier plate (28) comprises a central bore (29), whose diameter is dimensioned as at least large enough that with the stepped planets (22; 22') preassembled, the sun wheels (25, 26) can be inserted with their sets of teeth into the sets of teeth (231, 241) of the planet wheels (23, 24).

19. The actuator device of claim 18, wherein the sets of teeth of the sun wheels (25, 26) are chamfered, on the free end of the sun wheels (25, 26) pointing in the insertion direction.

20. An actuator device for superimposed steering engagement in a vehicle steering system, including first and second input shafts (12, 14), an output shaft (13) coaxial with the first input shaft (12), and a superposition gear (15) disposed between the first and second input shafts (12, 14) and received in an actuator housing (11),
the superposition gear (15) comprising a two-stage, modified planetary gear (16), which has a first sun wheel (25), connected in a manner fixed against relative rotation to the first input shaft (12), a second sun wheel (26) connected in a manner fixed against relative rotation to the output shaft (13), a satellite carrier (21) that is drivable by the second input shaft(14), and at least one one-piece stepped planet (22; 22') retained rotatably on the satellite carrier (21), with two planet wheels (23, 24) spaced apart axially from one another and disposed one at each end portion of a smaller-diameter shaft portion (221), with one planet wheel meshing with the first and the other planet wheel meshing with the second sun wheel (25, 26), and a self-locking worm gear (17) disposed between the second input shaft (14) and the satellite carrier (21), the worm gear having a worm (18) connected to the second input shaft (14) in a manner fixed against relative rotation, and a worm wheel (20) connected to the satellite carrier (21) in a manner fixed against relative rotation, the worm wheel (20) being placed on the satellite carrier (21) being the region of the shaft portion (221) of the stepped planets (22; 22'), and the satellite carrier (21) being embodied hollow-cylindrically, wherein the stepped planets (22') are hollow on the inside, and further comprising two roller bearings (32), maximally spaced apart from each other, mounted on an insertion shaft (51) retained in receiving bores (52) in the satellite carrier plates (28), the two roller bearings (32) bracing the stepped planets (22').

21. The actuator device of claim 20, wherein the roller bearings (32) are disposed in the region of the planet wheels (23, 24).

22. The actuator device of claim 20, further comprising roller bearings (27), preferably ball bearings, rotatably supporting the first input shaft (12) and the output shaft (13) in the actuator housing (11); the at least one one-piece stepped planet carriers (22') comprises three stepped planets (22') offset from one another by defined circumferential angles; the satellite carrier (21) being rotatably supported on the two sun wheels (25, 26) via the sets of teeth (231, 241) of the planet wheels (23, 24) of the three stepped planets (22').

23. The actuator device of claim 22, wherein in each satellite carrier plate (28), one of the receiving bores (52a) for the insertion shafts (51) is embodied resiliently in the radial direction, and its radial spacing from the axis of the satellite carrier plate (28) differs from the radial spacings of the other two receiving bores (52) from the axis of the satellite carrier plate (28), which latter spacings are in turn of equal size.

24. The actuator device of claim 20, wherein the roller bearings (32) of the stepped planets (22') are formed by needle rings, which are each inserted into a bearing bore (46), made in the stepped planets (22') from each face end inward.

25. The actuator device of claim 20, wherein the satellite carrier plates (28) have a slight plate thickness that is preferably less than 3 mm.

26. The actuator device of claim 20, wherein the satellite carrier plates (28) are aligned with one another in the circumferential direction and are connected to the satellite carrier (21) in a manner fixed against relative rotation, for instance by means of calking or welding.

27. The actuator device of claim 20, wherein the receiving bores (52) are formed into the satellite carrier plates (28) with a lesser diameter than the final size; and wherein after the satellite carrier plates (28) have been joined to the satellite carrier (21), the receiving bores (52) are finish-machined to the final size.

* * * * *